2,713,032
OIL-IN-WATER EMULSION DRILLING FLUID

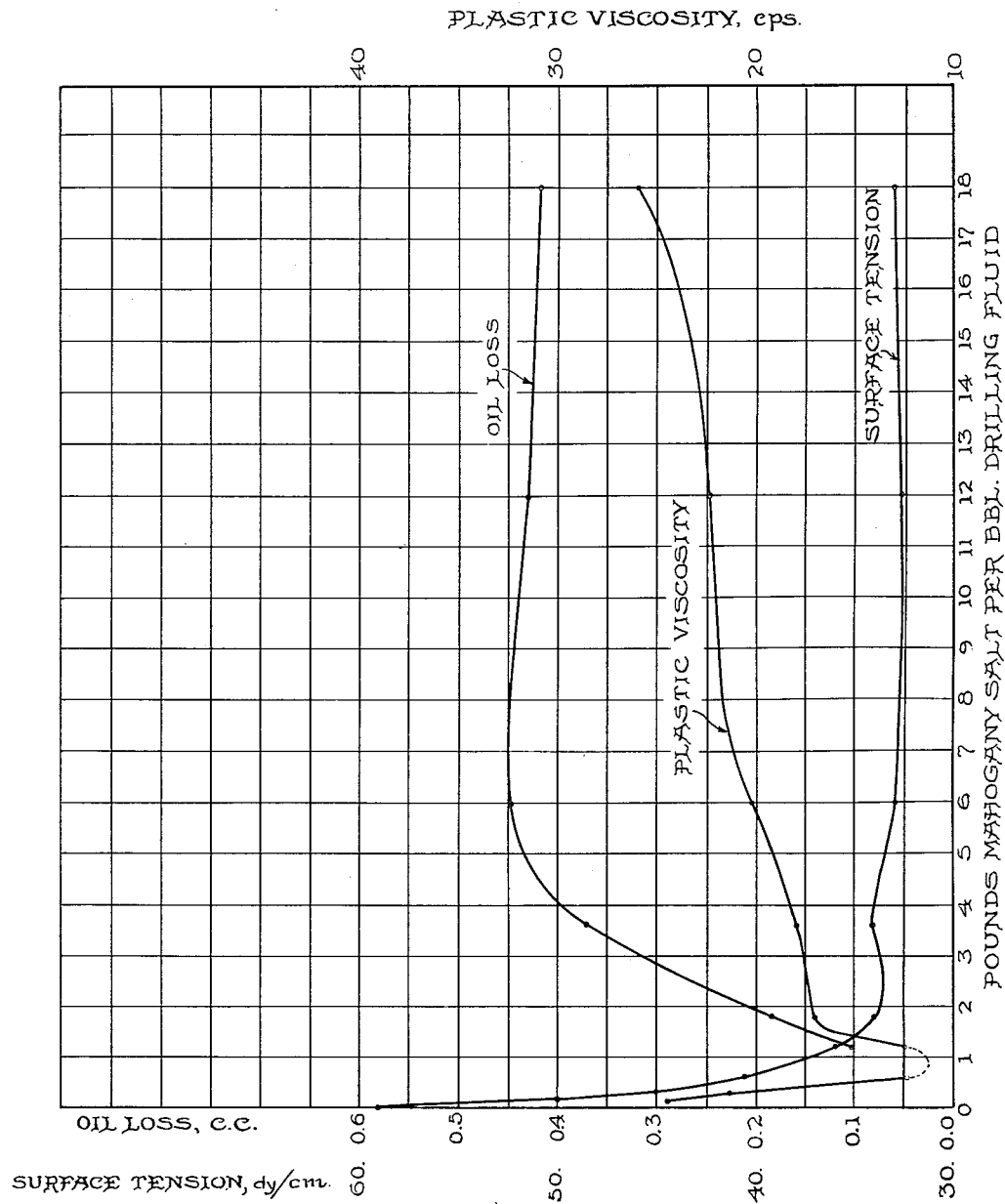

Rodolfo J. Tailleur, San Tome, Venezuela, assignor to Gulf Oil Corporation, Pittsburgh, Pa., a corporation of Pennsylvania Application April 22, 1953, Serial No. 350,460

10 Claims. (Cl. 252—8.5)

This invention relates to improvements in the drilling of wells, and is more specifically concerned with the composition, preparation, and use of an improved drilling fluid.

As the technology of rotary well-drilling has advanced, the importance of the chemical and physical properties of drilling fluids and the susceptibility of such properties to control have become increasingly evident, particularly as wells are being drilled with increasing frequency to greater and greater depths.

Drilling fluids must perform a plurality of functions and, unhappily, it appears that any drilling fluid must be a compromise in several of its chemical and its physical properties, since the chemical and/or physical properties of a drilling fluid necessary to attain two desired functions are often diametrically opposed. In other words, changing either a physical or chemical property of a drilling fluid so as to improve the performance of one function of a drilling fluid is all too frequently accompanied by a diminution in performance with respect to another desired function.

In attempting to develop drilling fluids representing the best compromises with respect to cost, performance characteristics, and particular drilling conditions, four major classes of drilling fluids have evolved, namely, water-base drilling fluids, oil-base drilling fluids, water-in-oil emulsion drilling fluids, and oil-in-water emulsion drilling fluids. Oil-in-water emulsion drilling fluids are distinguished from the other classes of drilling fluids by comprising a continuous aqueous phase in which an oil phase is dispersed. While some water-base drilling fluids may contain relatively minor amounts of a dispersed liquid phase, oil-in-water emulsion drilling fluids are recognized by those skilled in the art as distinguished from such water-base drilling fluids by the fact that oil-in-water emulsion drilling fluids contain substantially larger proportions of a dispersed or emulsified liquid phase, usually upwards of about five per cent by volume of the total drilling fluid.

The instant invention relates to improved oil-in-water emulsion drilling fluids for use with rotary drilling equipment; which drilling fluids are characterized in that they make possible high drilling rates and high footage drilled per bit, while at the same time having good flow and thixotropic properties and yielding filtrates which are relatively free from oil, thereby avoiding loss of oil and minimizing undesirable contamination of the formation traversed by the well.

The research work conducted in connection with this invention has indicated the existence of an empirical relationship between the drilling rate obtained through the use of an oil-in-water emulsion drilling fluid and the surface tension of the filtrate of such drilling fluid. It has been found that faster drilling rates may be achieved through the use of oil-in-water emulsion drilling fluids, when the surface tension of the filtrate has a reduced value.

While the reason for such an empirical relationship is not altogether certain, it is thought plausible that such relationship stems from the fact that a filtrate having a low surface tension will more readily penetrate and wet the formation in advance of the drill bit, thereby softening the formation for easier cutting. Such explanation of the phenomenon is supported by the fact that the research conducted on this invention has shown that greater footage may be drilled per bit with oil-in-water emulsion drilling fluids having filtrates of reduced surface tension.

The experiments and actual drilling operations conducted in connection with the development of this invention have indicated that a high oil loss or concentration of oil in the filtrate is undesirable. It has been found that both oil loss and the concentration of oil in the filtrate should be as low as possible, inasmuch as incursion of the earth formations by the oil in the drilling fluid interferes seriously with the reliability of information that may be obtained by modern well-survey methods, especially certain radiological well-logging methods, relative to hydrocarbons native to the formations. Also, oil incursion of formations is objectionable inasmuch as a great deal, if not all, of the value of drill cuttings and cores as sources of information about formations being drilled is destroyed. In addition, it is also thought possible that an increase of oil concentration in a filtrate may tend to affect adversely the drilling rate by impairing either the rate at which the filtrate wets the formation, or the degree to which the formation is softened by being wet by the filtrate.

The research work also indicated, inasmuch as non-Newtonian fluids are involved, that the plastic viscosity of an oil-in-water emulsion drilling fluid should be as low as possible, while the yield value of the drilling fluid should be adjusted to impart to the drilling fluid the desired over-all flow characteristics usually loosely defined as "viscosity." Also, it was found that, in general, the yield values of oil-in-water emulsion drilling fluids tended to be too high, considering their plastic viscosities, and that conventional oil-in-water emulsion drilling fluids usually must be treated specfically to reduce their yield values.

The oil-in-water emulsion drilling fluids of the invention having the advantageous properties discussed above are prepared by mixing the components of a water-base drilling mud, oil, and an amount of an organic sulfonate of the class described below equal to about 0.1 to about 2 pounds per barrel of the completed emulsion drilling fluid. As brought out in the following discussion, preferred results are usually obtained when not more than about 1.5 pounds of such an organic sulfonate per barrel of the emulsion drilling fluid are used. The use of a small amount of the organic sulfonate within the above range is not only productive of an improved oil-in-water emulsion drilling fluid but also makes possible the preparation of such a drilling fluid at a comparatively low cost.

The organic sulfonates that can be employed in accordance with the invention are the alkali metal and ammonium salts of preferentially oil-soluble sulfonic acids. I prefer to employ such salts of preferentially oil-soluble petroleum sulfonic acids; i. e., mahogany acids. Other salts that can be used are the alkali metal and ammonium salts of preferentially oil soluble alkyl aryl sulfonic acids and alkyl sulfonic acids. Examples of such acids are wax benzene sulfonic acids and alkyl sulfonic acids in which the alkyl chain contains a sufficient number of carbon atoms as to confer the property of having limited solubility in water and being preferentially soluble in oil.

The salts of mahogany acids are well known in the art, being by-products of the refining of lubricating oils and white oils, and have been suggested heretofore as treating agents for water-base drilling fluids.

Salts of mahogany acids, suitable for the practice of this invention, are commercially available in oil and are marketed in such form as Petronate (60 per cent by weight of sodium salts of mahogany acids and 40 per cent by weight of lubricating oil) by L. Sonneborn Sons, Inc., New York, and as Petroleum Sulfonate No. 70 by the Mineral Oil Refining Co., Dickinson, Texas.

The oils that can be used in the practice of the invention are hydrocarbon oils such as crude oil, topped crude oil, and various petroleum fractions such as kerosene, diesel oil, gas oil, heavy fuel oil, etc. Topped crude oil and the heavier petroleum fractions, such as the diesel oil fractions and heavier, are generally employed in making up the emulsion drilling fluids of the invention. Such oils may be present in the drilling fluids of this invention in amounts ranging upwards from about 5 per cent by volume of the drilling fluid to the largest amount of oil that can be emulsified in the drilling fluid without inversion of the emulsion drilling fluid into an emulsion of the water-in-oil type. The preferred range of oil concentration is about 10 to about 25 per cent by volume of the total drilling fluid, and in no event should the oil concentration be so high as to render the drilling fluid uncirculatable.

The oil-in-water emulsion drilling fluids of the invention are usually prepared by incorporating into a water-base drilling fluid the desired amount of oil and an amount of an organic sulfonate of the above class within the range of about 0.1 to about 2 pounds of sulfonate per barrel of completed emulsion drilling fluid. The desired emulsion drilling fluid will usually be obtained by normal circulation of the combination of the water-base drilling fluid, the oil and the sulfonate although additional mechanical agitation may be provided if desired. As previously indicated, the resulting oil-in-water emulsion drilling fluid yields a filtrate which has a low surface tension and contains a minimum amount of oil in relation to the oil concentration in the drilling fluid. Moreover, the drilling fluid has a low plastic viscosity, low yield value and permits obtaining a rapid drilling rate. The advantages of the present invention will be readily apparent from a consideration of the following examples:

EXAMPLE 1

A set of oil-in-water emulsion drilling fluid samples containing various concentrations of such salts was prepared. Each sample was tested as to fluid loss, the per cent oil in the filtrate, oil loss, the surface tension of the filtrate, and the plastic viscosity and yield value of the drilling fluid. The samples were prepared by mixing a topped Eastern Venezuelan crude oil and a concentrate of the sodium salts of mahogany acids in lubricating oil (Petronate—60 per cent such salts and 40 per cent lubricating oil by weight), and then emulsifying the topped crude in a conventional water-base drilling fluid containing dispersed colloidal clayey solids. Each of the samples contained 23 per cent oil by volume and they were aged overnight at 140° F. in sealed containers prior to testing. All the tests were conducted at room temperature (about 75° F.), except those for plastic viscosity and yield value, which were conducted at 108° F. The data obtained in such tests are presented in Table I. In Table I, as well as throughout the specification and claims, the barrel referred to is 42 U. S. gallons.

Referring now to the accompanying drawing, which is a graphical representation of data presented in Table I, it will be seen that the surface tension of the filtrate varies in accordance with increasing concentration of the mahogany salt in a manner generally characteristic of the effects produced by surface-active agents, that is, the surface tension depressing effect of additional increments of such agent progressively decreases with increasing concentration thereof, until such a point is reached that further addition of the surface-active agent does not produce a significant effect upon the surface tension.

It will be seen that the oil loss is low when the amount of mahogany salt is within the range of about 0.1 to about 2 pounds per barrel of emulsion drilling fluid, and that the oil loss increases rapidly when more salt is used.

Inasmuch as it is desired that the filtrate surface tension and the oil loss be of the lowest values possible, the accompanying drawing makes is graphically apparent that these desiderata can only be attained when the mahogany salt is used in the low and relatively narrow concentration range, namely, about 0.1 to about 2 pounds of the salt per barrel. Use of mahogany salt concentrations greater than such critical range not only is more expensive but is accompanied by a relatively insignificant further reduction in filtrate surface tension, while inordinate increases in oil loss and concentration of oil in the filtrate are experienced. On the other hand, use of mahogany salt concentrations less than such concentration range would serve only to further reduce an already quite low oil loss, while vastly increasing the filtrate surface tension with a corresponding reduction in drilling rate.

The plastic viscosity curve for this particular drilling fluid is interesting in that a sharp minimum exists at about a concentration af between 0.6 and 1.2 pounds of the mahogany salt per barrel of drilling fluid. The coincidence of this concentration range with the above-mentioned concentration range is fortunate in view of the desirability of a drilling fluid of low plastic viscosity. While it may be expected that such a minimum in plastic viscosity will not always occur, particularly in exact coincidence with the above-mentioned concentration range, this consideration tends to supplement the importance of incorporating the mahogany salts in amounts within the stated concentration range.

Referring again to the data presented in Table I, it will be noted that low yield values are obtained at concentrations of 0.1 to 2 pounds of mahogany salts per barrel, whereas high yield values are obtained with higher concentrations of the mahogany salts.

In regard to fluid loss, increase in concentration of the mahogany salts above the above-mentioned range reduces the fluid loss. However, the advantage of decreasing the fluid loss through the agency of increasing the degree of dispersion of the oil through the use of higher concentrations of mahogany salts is lessened by the increased diffusiveness of the oil with respect to the filter cake. In fact, the increase in diffusiveness of the oil is so rapid relative to the diminishing fluid loss attained by the use of increased mahogany salt concentrations, that the oil loss as well as the concentration of oil in the filtrate increases substantially.

It will therefore be apparent that, with a given per-

*Table I*

|  | 1 | 2 | 3 | 4 | 5 | 6 | 7 | 8 | 9 | 10 |
|---|---|---|---|---|---|---|---|---|---|---|
| Sodium Salts of Mahogany Acids (pounds per barrel of drilling fluid) | 0 | 0.15 | 0.3 | 0.6 | 1.2 | 1.8 | 3.6 | 6.0 | 12.0 | 18.0 |
| Fluid Loss, cc. (30 minutes at 100 pounds per square inch) | 5.0 | 7.2 | 6.8 | 6.2 | 5.2 | 4.6 | 3.7 | 3.2 | 2.4 | 2.1 |
| Percent Oil by Volume in the Filtrate | Trace | Trace | Trace | Trace | 2.0 | 4.0 | 10.0 | 14.0 | 18.0 | 20.0 |
| Oil Loss, cc. (30 minutes at 100 pounds per square inch) | do | do | do | do | 0.104 | 0.184 | 0.37 | 0.448 | 0.432 | 0.42 |
| Surface Tension of Filtrate (dynes per centimeter) | 59.0 | 50.0 | 45.0 | 40.5 | 36.0 | 34.0 | 34.2 | 33.0 | 32.8 | 33.0 |
| Plastic Viscosity, cps | (*) | 24.4 | 21.3 | 12.3 | 12.5 | 17.1 | 18.0 | 20.3 | 22.4 | 26.0 |
| Yield Value (pounds per 100 square feet) | (*) | 21.0 | 19.8 | 23.9 | 27.2 | 31.3 | 44.5 | 54.4 | 52.8 | 52.9 |

*Determination impossible, as the oil was poorly emulsified.

centage of oil in an oil-in-water emulsion drilling fluid, either a maximum permissible oil concentration in the filtrate or a maximum permissible oil loss will limit the maximum extent to which fluid loss may be reduced by increasing the concentration of the mahogany salt in the drilling fluid. Nevertheless, valuable oil-in-water emulsion drilling fluids having a normally satisfactory fluid loss can be prepared in accordance with the invention, while observing such limitations of the amount of mahogany salt used.

In the event still lower fluid loss is desired than may be obtained through the use of mahogany salt, as discussed in the preceding paragraph, it has been discovered that treatment with a clay deflocculant will enhance the drilling fluid in this respect and also improve the gelling properties of the drilling fluid by reducing the yield value thereof, without diminishing any of the benefits previously attained through the use of mahogany salt in amounts within the critical concentration range. Thus, the use of the optional and additional treatment with a clay deflocculant is indicated where either the fluid loss or yield value, of an oil-in-water emulsion drilling fluid incorporating mahogany salt in the stated concentration range, should be lowered.

A wide variety of clay deflocculants, both inorganic and organic, are well known in the art, among which may be mentioned various complex phosphates, silicates, tannates, lignin sulfonates, and humates. Such clay deflocculants possess the common property of promoting the degree of dispersion of clays in aqueous media, and are particularly effective for such purposes in alkaline solutions.

One of the most widely used clay deflocculants and generally representative thereof is quebracho. The treatment of an oil-in-water emulsion drilling fluid containing an amount of mahogany salt falling within the critical concentration range thereof with a clay deflocculant is one embodiment of the present invention. This embodiment is illustrated by the following example.

EXAMPLE 2

A set of oil-in-water emulsion drilling fluid samples were prepared, each containing 23 per cent by volume of a topped crude oil and a concentration of 1.2 pounds of the sodium salts of mahogany acids per barrel of drilling fluid. The samples were prepared by admixing the topped crude oil with the requisite amount of the mahogany salts, and then emulsifying the mixture in a conventional waterbase drilling fluid that had been obtained at a drilling site. The individual samples were then treated with differing concentrations of quebracho, both with and without added caustic soda, and tested for filtrate surface tension, plastic viscosity, yield value, fluid loss, and pH. The results of such tests are tabulated in Table II.

being most pronounced until a concentration of one pound of quebracho per barrel is used. However, a minimum fluid loss is obtained in the use of a mixture of quebracho and caustic soda, when each is used in an amount of about one pound per barrel. Thus, it will be seen that oil-in-water emulsion drilling fluids containing mahogany salt in accordance with the principles of this invention show an excellent and wholly beneficial response to treatment with a clay deflocculant for reducing fluid loss.

The clay deflocculant, by its action on the clay, complements the oil dispersing effects of the mahogany salt in producing a highly impervious composite filter cake by the deposition of colloidal clayey solids and the minutest particles of oil commensurate with low diffusiveness of the oil. Thus, the mahogany salt minimizes the concentration of oil in the filtrate and the clay deflocculant minimizes the fluid loss, by the joint action of the oil and clay particles forming a filter cake of optimum filtering characteristics.

With respect to yield value, inspection of Table II shows that the use of quebracho sharply reduces the yield value, with quebracho concentrations up to about one pound per barrel being particularly effective for the drilling fluid employed. In the use of combined quebracho and caustic soda treatment, a very low minimum in yield value for this particular drilling fluid is obtained when quebracho and caustic soda are each used in concentrations of about one-half pound per barrel.

The optimum amount of quebracho that should be used in the oil-in-water emulsion drilling fluids of the invention will vary depending upon the concentration of clays in the fluids, larger amounts of quebracho being used with fluids having high concentrations of clays. In general, the quebracho should be used in amounts within the range of about 0.1 to 1.5 pounds per barrel of drilling fluid. If caustic soda is used with the quebracho, the weight ratio of quebracho to caustic soda will ordinarily vary from about 5:1 to 1:1 depending upon the nature of the drilling fluid and the pH it is desired to maintain in the drilling fluid.

It will be seen that the optional additional use of a clay deflocculant cooperates with the use of the mahogany salt in a highly beneficial manner, that is, the clay deflocculant does not adversely affect the state of oil emulsification and the advantages stemming therefrom, while sharply reducing the fluid loss and yield value by increasing the dispersion of the clayey solids. Thus, none of the advantages gained by the use of mahogany salt in the critical concentration range are lost through the additional treatment with a clay deflocculant, while the fluid loss and the yield value characteristics are substantially enhanced thereby.

The invention will be further illustrated by the following examples.

*Table II*

| Sample | 1 | 2 | 3 | 4 | 5 | 6 | 7 | 8 | 9 |
|---|---|---|---|---|---|---|---|---|---|
| Quebracho (pounds per barrel) | 0.0 | 0.025 | 0.5 | 1.0 | 1.5 | 0.25 | 0.5 | 1.0 | 1.5 |
| Caustic Soda (pounds per barrel) | 0.0 | 0.0 | 0.0 | 0.0 | 0.0 | 0.25 | 0.5 | 1.0 | 1.5 |
| Surface Tension (dynes per centimeter) | 35.5 | 34.1 | 34.0 | 35.5 | 35.5 | 35.8 | 36.0 | 34.0 | 33.5 |
| Plastic Viscosity, cps | 19.9 | 18.8 | 19.5 | 19.5 | 19.5 | 18.8 | 17.3 | 15.7 | 17.3 |
| Yield Value (pounds per 100 square feet) | 50.3 | 4.95 | 4.95 | 4.12 | 4.12 | 2.47 | 1.65 | 3.30 | 4.12 |
| Fluid Loss, cc. (30 minutes at 100 pounds per square inch) | 5.1 | 4.7 | 4.5 | 3.1 | 3.0 | 4.0 | 3.6 | 2.8 | 3.6 |
| pH | 7.3 | 7.0 | 6.5 | 6.25 | 6.1 | 8.2 | 9.2 | 9.8 | 10.0 |

Upon inspection of the data presented in Table II, it will be seen that the addition of quebracho by itself or with caustic soda produces only relatively minor changes in filtrate surface tension and plastic viscosity; however, such additives produce significant changes in fluid loss and in yield value.

With respect to the fluid loss, it will be seen that the use of increasing quantities of quebracho produces a progressive decrease in fluid loss, with the rate of decrease

EXAMPLE 3

An oil-in-water emulsion drilling fluid was prepared by emulsifying a topped Eastern Venezuelan crude in a waterbase drilling fluid with the addition of sufficient sodium mahogany salts to contain 30 per cent by volume oil and 1.2 pounds of sodium mahogany salts per barrel of drilling fluid. Such oil-in-water emulsion drilling fluid had a filtrate surface tension of 41.8 dynes per centimeter and the filtrate contained 1.7 per cent by volume oil.

Another oil-in-water emulsion drilling fluid was prepared identical to that of the preceding paragraph, except that the concentration of the sodium mahogany salts was 2.4 pounds per barrel of drilling fluid. This drilling fluid had a filtrate surface tension of 35.5 dynes per centimeter and the filtrate contained 5.0 per cent oil by volume.

EXAMPLE 4

An oil-in-water emulsion drilling fluid was prepared by emulsifying a mixture of diesel oil (a distillate of a blend of Venezuelan and Kuwait crudes) and sodium mahogany salts in a water-base drilling fluid. The resulting drilling fluid contained 10 per cent by volume oil and 0.6 pound mahogany salts per barrel of drilling fluid, and produced a filtrate having a surface tension of 37.0 dynes per centimeter and containing only a trace of oil.

An otherwise identical emulsion drilling fluid was prepared containing a greater concentration of mahogany salts, namely, 1.2 pounds per barrel of drilling fluid. This drilling fluid produced a filtrate having a surface tension of 34.0 dynes per centimeter and containing 0.7 per cent oil by volume.

A further emulsion drilling fluid containing a still greater concentration of the mahogany salts (2.4 pounds per barrel of drilling fluid) was prepared and was found to produce a filtrate having a surface tension of 34.3 dynes per centimeter and containing 1.3 per cent oil by volume.

EXAMPLE 5

An oil-in-water emulsion drilling fluid was prepared from the same components as were used in preparing the emulsion drilling fluids of Example 4, with the proportions changed so that the resulting drilling fluid contained 15 per cent diesel oil by volume and 0.6 pound of sodium mahogany salts per barrel. This drilling fluid produced a filtrate having a surface tension of 38.5 dynes per centimeter and containing 2.75 per cent oil by volume.

A similar emulsion drilling fluid was prepared containing 15 per cent diesel oil by volume and 2.4 pounds of mahogany salts per barrel, and was found to produce a filtrate having a surface tension of 36 dynes per centimeter and containing 3.8 per cent oil by volume.

In the above examples, the fluid loss was ascertained in accordance with the standard procedures defined in "Recommended Practice on Standard Field Procedure for Testing Drilling Fluids, A. P. I. Code No. 29, Second Edition," published July 1942, page 11; with the concentration of oil in the filtrate being based on the first two cubic centimeters of filtrate passing through the filter.

Since the advantages obtained through the use of mahogany salt according to the principles of this invention are thought to be closely related to the degree of oil emulsification obtained thereby, the concentration of the mahogany salt best suited for the practice of this invention will vary slightly with different oils, since some oils appear to contain natural emulsifying agents as borne out by the fact that some crudes emulsify more readily than others. Accordingly, the fruits of this invention may be more fully realized by using mahogany salt concentrations near, or even slightly lower than, the lower end of the stated critical concentration range with an oil that demonstrates a greater readiness to emulsify in water; and, conversely, an oil that tends to resist emulsification indicates the desirability of using a mahogany salt concentration near the upper end of the stated critical concentration range.

Oil-in-water emulsion drilling fluids prepared in accordance with this invention can, of course, be weighted by conventional weighting agents as desired. In addition, treating agents that are customarily used for controlling the viscosity and fluid loss of water-base drilling fluids, such as starch and cellulose derivatives, can be advantageously employed with the oil-in-water emulsion drilling fluids of this invention; however, such additional treating agent should not be of such character or used in such amounts as to disturb substantially the state of emulsification of the oil.

An advantage of the invention is the fact that the principles thereof can be easily applied during drilling operations. This is the case with respect to the preparation of the drilling fluid from its components, the conversion of water-base drilling fluids to the drilling fluids of this invention, and the maintenance of the composition of the drilling fluid during drilling.

The drilling fluids of this invention can be readily prepared from the components thereof by dispersing the colloidal clayey solids in water and then adding the oil and the mahogany salt with sufficient mechanical agitation to insure emsulsification of the oil and a uniform mixture. A clay deflocculant, if deemed desirable, can be added to the drilling fluid prior to or after the addition of the oil. The mahogany salt is preferably added to the water at the time the oil is added or thereafter in order to avoid foaming. It has been found that the admixture of the mahogany salt with either oil or water and oil is greatly facilitated if the same is added in the form of a concentrate in oil, such as the previously mentioned commercially available forms thereof. It is usually preferred that the mahogany salt be admixed with the oil prior to the addition of the oil to the water, as this assures ready emulsification of the oil and a uniform distribution of the mahogany salt in the body of the drilling fluid with a minimum of mechanical agitation.

Conversion of a conventional water-base drilling fluid can be accomplished during the circulation of the drilling fluid in the well by adding oil to the circulating drilling fluid at a rate dependent upon the total amount of drilling fluid in the system and the rate of drilling fluid circulation so as to assure a substantially uniform concentration of the oil. Conventional methods can be employed for whatever mechanical agitation is necessary to achieve proper mixing, such as jetting fluid in the storage tanks.

The mahogany salt in a requisite amount and at the proper rate is added to the circulating drilling fluid either at the same time as the oil, preferably in admixture therewith, or subsequent to the addition of the oil. The addition of the mahogany salt to the water-base drilling fluid prior to the addition of the oil would ordinarily result in excessive foaming and, consequently, the circulation of such foaming drilling fluid into the well would entail a risk of a blowout.

During drilling with drilling fluids of this invention, the effective concentration of the ammonium and alkali metal salts of mahogany acids may be reduced by reaction with components of the drilling fluid or the formation traversed by the well. When such depletion has reached the point that the addition of mahogany salts becomes necessary in order to enjoy the fruits of this invention, such fact may be speedily ascertained at the drilling site by testing the filtrate to determine its surface tension and oil content.

Mention has previously been made of the fact that the concentration of mahogany salts required to produce the optimum results obtainable through the practice of this invention will vary somewhat within the critical concentration range depending on the particular nature of the oil used in the emulsion. It should also be mentioned that the concentration of the mahogany salts that will be the most desirable from the economic point of view and the viewpoint of results obtained will also tend to vary with the concentration of oil in the drilling fluid and with the A. P. I. gravity of the oil.

I have found that in using a given oil in the oil-in-water emulsion drilling fluid, lesser concentrations of the mahogany salts within the stated concentration range can be used with higher concentrations of the oil. In general, I have found that the concentration of oil in the filtrate increases with higher concentrations of oil in the drilling fluid. Accordingly, in some instances it will be necessary that concentrations of mahogany salts substantially less than the upper limit of the stated critical concentration range thereof be employed, in order to avoid objectionably high concentrations of oil in the filtrate, say 3 per cent oil by volume or more.

I have also found that in most instances of using oils of higher A. P. I. gravity, lower concentrations, within the stated concentration range, of mahogany salts can be used. In particularly marked instances of this sort, it can be essential that the mahogany salts be employed in concentrations less than the upper limit of the stated concentration range, in order to avoid objectionably high concentrations of the oil in the filtrate.

The full advantages of this invention are realized only when the mahogany salts are used in sufficient concentration to reduce the surface tension to 50 dynes per centimeter or below and preferably to 45 dynes per centimeter and less.

In general, a sufficient amount of the mahogany salts is used to reduce the surface tension to the desired low value discussed above, while at the same time not using an amount effective to increase the concentration of oil in the filtrate to an undesirably high value. It is preferred that the amount of mahogany salts used be less than that which will increase the concentration of oil in the filtrate to more than one-tenth the concentration of the oil in the drilling fluid.

"Consisting essentially of" as used in the claims means that the composition is made up almost entirely of the ingredients recited and these ingredients are the main and characterizing ones, but this expression does not exclude the presence of minor amounts of other ingredients which are commonly employed in drilling fluids, nor substantial quantities of ingredients which are merely inert. Such added ingredients would not change the essential novel characteristics of the composition.

The actual scope of the invention is not to be considered limited by the preceding detailed description thereof, nor by the theories advanced for explaining the same, but should be ascertained upon consideration of the appended claims.

I claim:

1. A process of drilling a well which comprises drilling a portion of said well while circulating in said well a water-base drilling fluid comprising dispersed clays, then adding to said water-base drilling fluid a petroleum oil and an alkali metal salt of mahogany acids, said petroleum oil and said alkali metal salt being added to said water-base drilling fluid in amounts adapted to convert said water-base drilling fluid to an oil-in-water emulsion drilling fluid, the amount of said petroleum oil being at least about 5 per cent by volume of said oil-in-water emulsion drilling fluid and the amount of said alkali metal salt being within the range of about 0.1 to about 2 pounds per barrel of said oil-in-water emulsion drilling fluid, circulating the resulting mixture of said water-base drilling fluid, said petroleum oil, and said alkali metal salt in said well to convert said water-base drilling fluid to an oil-in-water emulsion drilling fluid, and continuing drilling said well while circulating said oil-in-water emulsion drilling fluid.

2. An oil-in-water emulsion drilling fluid consisting essentially of at least 5 per cent by volume of oil, a dispersed clay, 0.1 to 2 pounds per barrel of said drilling fluid of a salt selected from the group consisting of the alkali metal and ammonium salts of preferentially oil-soluble sulfonic acids, and water, said oil being the dispersed phase and said water being the continuous phase.

3. The drilling fluid of claim 2, wherein the preferentially oil-soluble sulfonic acids are mahogany acids.

4. The drilling fluid of claim 2, wherein the salt is an alkali metal salt of mahogany acids.

5. The drilling fluid of claim 2, wherein the salt is the sodium salt of mahogany acids.

6. The drilling fluid of claim 2, wherein the oil is present in an amount of from 5 to 25 per cent by volume.

7. The drilling fluid of claim 2, wherein there is additionally present an amount of clay deflocculant effective to reduce the fluid loss of said drilling fluid.

8. The drilling fluid of claim 7, wherein the deflocculant is quebracho.

9. An oil-in-water emulsion drilling fluid consisting essentially of 10 to 25 per cent by volume of a hydrocarbon oil, a dispersed clay, 0.1 to 2 pounds per barrel of said drilling fluid of the sodium salt of mahogany acids, and water, said oil being the dispersed phase and said water being the continuous phase.

10. The drilling fluid of claim 9, wherein there is additionally present from 0.1 to 1.5 pounds of quebracho per barrel of drilling fluid, and the drilling fluid is alkaline.

References Cited in the file of this patent

UNITED STATES PATENTS

| | | |
|---|---|---|
| 2,550,236 | Fischer et al. | Apr. 24, 1951 |
| 2,555,794 | Henkes | June 5, 1951 |
| 2,568,992 | Doscher | Sept. 25, 1951 |
| 2,655,475 | Fischer et al. | Oct. 13, 1953 |

OTHER REFERENCES

Van Dyke: Oil Emulsion Drilling Mud, article in World Oil, November 1950, pages 101–104 and 106.